Aug. 21, 1934.  J. J. SUNDAY  1,970,824
AUTOMOBILE HEATER
Filed May 4, 1932  2 Sheets-Sheet 2
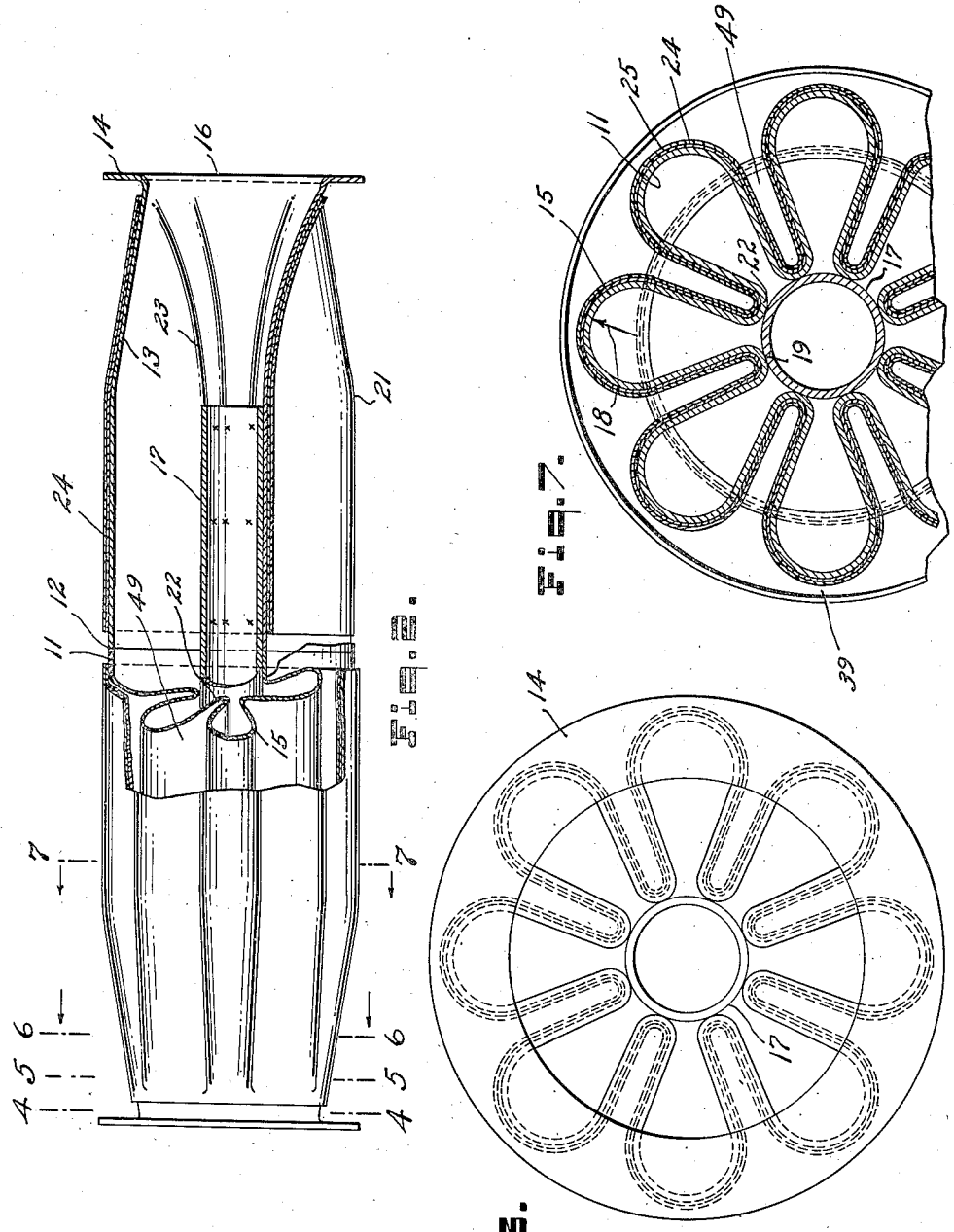
INVENTOR.
James J. Sunday
BY Barnes, Kisselle and Laughlin
ATTORNEY.

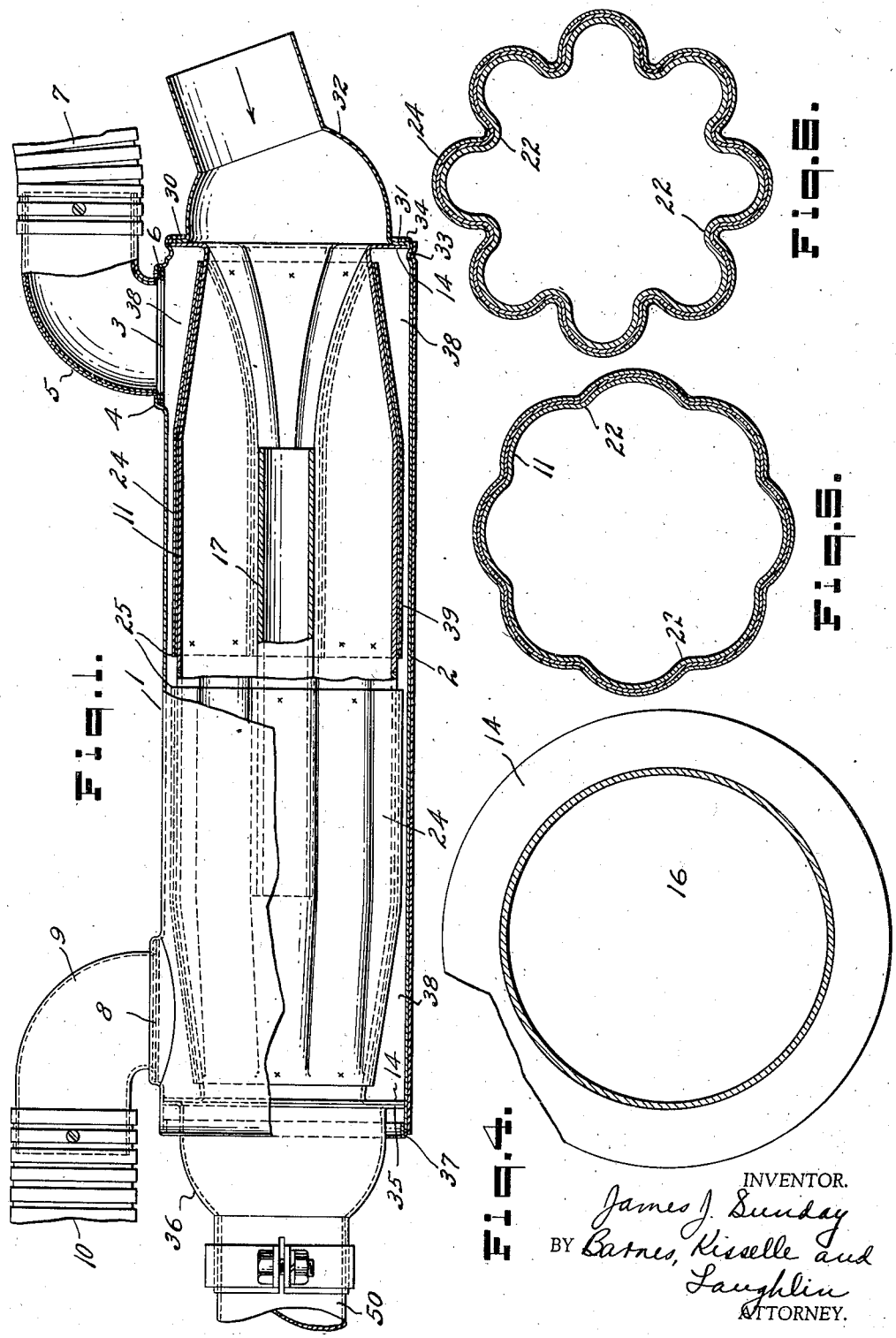

Patented Aug. 21, 1934

1,970,824

UNITED STATES PATENT OFFICE 1,970,824

AUTOMOBILE HEATER

James J. Sunday, Detroit, Mich.

Application May 4, 1932, Serial No. 609,089

8 Claims. (Cl. 257—241)

This invention relates to an automobile heater of the type which utilizes the exhaust gases from the engine as the source of heat.

In the automobile heater art one of the big problems is to obtain a sufficient amount of heat to warm the entire inside of the vehicle body rather than just that portion of the interior of the body immediately adjacent the hot air outlet. The exhaust gases from the engine afford a sufficient source of heat provided the heat transfer can be effected from the exhaust gases to the air inside the body. The trend in automobile construction is toward the low swung body and chassis. Such a chassis frame as either the well known drop center of the banjo type bring the frame and the body nearer the ground. Hence, any commercially practical heater must necessarily be as compact as possible because of the fact that the body is low swung and clearance of the frame with the ground is very small. Hence, it is an object of this invention to produce a heater of the exhaust type which will present the greatest amount of heat transfer surface practicable within the smallest area possible so as to be very compact and highly efficient.

Another great problem that has been present in the field of heaters of the exhaust type is that of eliminating noise due to the vibration or pulsation of the exhaust gases. It is an object of this invention to produce an automobile heater of the exhaust type that is substantially noiseless in operation. This is achieved by utilizing a heat transfer surface comprising a plurality of sheet metal laminations which serve as vibration dampeners and noise absorbers.

In the drawings:

Figure 1 is an assembly view partly in section and partly broken away of the heater.

Figure 2 is an elevation partly in section of the inner structure of the heater.

Figure 3 is an end view looking into the inner structure of the heater.

Figure 4 is a section along the line 4—4 of Figure 2.

Figure 5 is a section along the line 5—5 of Figure 2.

Figure 6 is a section along the line 6—6 of Figure 2.

Figure 7 is a section along the line 7—7 of Figure 1.

Referring more particularly to the drawings, it will be seen that the heater comprises an outer casing 1 comprising a sheet of metal formed into a cylinder with the abutting longitudinal edges overlapped and welded as at 2. Since the outer casing is arranged to be connected with a source of fresh air and with one or more registers inside the vehicle body, to this end it is provided with an air intake opening 3 having a flange 4. The intake opening is arranged to receive the elbow 5 having the flange 6 which is welded to the flange 4. The elbow 5 is connected to the flexible hose 7 which is arranged to be connected to any suitable type of air blower which receives fresh air and blows the same through the hose 7, elbow 5, and opening 3 into a casing 1. The casing 1 is likewise provided with an air outlet opening 8 which is likewise provided with an elbow 9, and hose 10 for connecting the hot air outlet 8 with a suitable register within the vehicle body.

The outer casing is arranged to receive the inner structure of the heater by means of which the heat from the exhaust gas is transferred to the fresh air within the outer casing 1. The inner structure is shown in detail in Figure 2. The inner structure is designed to obtain the largest heat transfer possible within a small space, and comprises the inner sleeve 11 formed in two similar sections which are butt welded along their inner ends as at 12. It is understood that the inner sleeve 11 can be made from a single integral piece of metal but for manufacturing reasons it is made of the two sections butt welded as above described. The sleeve 11 is formed with a taper at each end as at 13 and provided, one at each end, with the outwardly turned flanges 14. The inner sleeve is so fabricated that its mid-section comprises a plurality of flutes 15 which coalesce and fade out at each end along the taper 13 as they approach the inlet 16. The flutes 15 are arranged radially around a common center and surround a pipe 17. The pipe 17, as shown, extends within the sleeve 11 between the tapered portions 13. Each of the flutes 15, from one end of the pipe 17 to the other, as shown in Figure 7, throughout this entire distance is in cross-section substantially the form of a horseshoe, the outer portion of which is formed along a true radius, as indicated by the arrow 18. The pipe 17 is spot welded to the sleeve 11 at a plurality of points along the junction of the flutes as at 19, as indicated by the crosses. It has been found that the insertion and spot-welding of the pipe 17 within the sleeve 11 assists in the elimination of noise and helps to make the heater quiet in operation.

Referring to Figures 7, 6, 5, 4, and 3, it will be seen that at the beginning of the taper, approximately at 21, each flute (Figure 7) in cross-section is substantially the shape of a horseshoe. As each flute approaches the opening 16 it gradually fades out. As shown in Figure 7, the junction 22 between each two adjoining flutes 15 is in contact with the pipe 17. This junction portion 22 between each of the flutes, as shown in Figure 2, gradually flares out along the curve 23 and finally vanishes at the opening 16. It will be noted that in Figure 6 the junction portions 22 are farther away from the longitudinal axis of the sleeve 11 than they are in the section shown in Figure 7. In Figure 5 the junctions 22 have moved still further out from the longitudinal axis of the sleeve 11 and finally, as shown in Figure 4, they merge and become the mouth 16 of the sleeve 11.

Since it is an object of this invention to eliminate vibration and noise in the heater, to this end the inner structure is laminated preferably substantially throughout its length and comprises a plurality of sleeves one within the other. The sleeve 11 has mounted thereover a plurality of sleeves such as those shown at 24. The sleeves 24 are formed with identically the same contour as the sleeve 11. The sleeves 24 cooperate with the sleeve 11 to form a laminated structure and, as indicated by the crosses, are spot welded at spaced points around each end to the inner sleeve 11 and to each other. It will be noted that the sleeves 24 have their inner adjacent ends 25 spaced from each other on each side of the butt welding line 12 of the inner sleeve 11. The inner ends 25 of sleeves 24 are spaced from each other on each side of the line 12 for manufacturing purposes only to permit the butt welding of the sections comprising sleeve 11. Although, as shown, the inner sleeve 11 is made from sixteen gauge (.065 inch) stock and the sleeves 24 of twenty-eight gauge (.018 inch) stock, it is understood that these various sleeves can be made from the same gauge stock or of any other suitable gauge sheet metal stock. The main function of this laminated structure comprising the sleeves 11 and 24 is that of dampening the vibrations in the metal set-up by the exhaust gases and thereby deadening and eliminating noise during operation.

The inner structure, fabricated as above described, is placed within the outer casing 1, as shown in Figure 1. The flanges 14 then have stitch welded thereto in gas tight relation as at 30 the flange 31 of the elbow 32 which is arranged to be connected to the exhaust conduit by any suitable coupling. The outer casing 1 is provided with a circumferential rib 33 which in conjunction with the inwardly turned flange 34 holds snugly therebetween the flanges 14 and 31 of the inner sleeve 11 and elbow 32 respectively. The flange 14 at the opposite end of the sleeve 11 has likewise stitch welded thereto as at 35, an exhaust gas outlet coupling 36 which is suitably connected to the exhaust pipe 50. The outer casing 1 is turned back upon itself as at 37 but it will be noted that flange 14, at the outlet end of the heater, is free to move longitudinally of the casing 1 to take care of expansion and contraction during the operation of the heater.

It will be noted that as above described, the inner structure of the heater is tapered adjacent each end as at 13. Hence, when the inner structure is positioned within the casing 1 there will be an annular opening 38 between the inner structure and the outer casing at each end. Further, it will be noted that the fresh air inlet 3 and the hot air outlet 8 are positioned adjacent the ends of the casing 1 and open directly into these enlarged spaces 38. Further, it will be noted that the portion of the inner structure extending between the tapered portions is provided with only a small clearance as at 39 with the outer casing 1. Hence, the fresh air passing through the opening 3 into the casing 1, upon entering the enlarged opening 38 follows the path of least resistance and flows completely around the inner structure and consequently passes longitudinally of the outer casing in the openings 49 between all of the flutes 15. The provision of the enlarged opening 38, created by the taper 13 of the inner structure, and the small clearance 39 between the inner structure and the outer casing causes the incoming air to follow the path of least resistance and consequently, prevents the larger portion of the air from passing lengthwise of the heater in any one of the spaces 49 between any two flutes. In other words, by virtue of the tapered portion 13 of the inner structure a complete distribution of the fresh air around the entire inner structure as it passes longitudinally thereof is effected thereby insuring that the entire surface of the inner structure will be effective as a heat transfer surface.

It is also found that as the exhaust gases come in from the right, as indicated by the arrow, the outward flare 23 of junction portions 22 of the flutes, as they fade out toward the mouth 16 in conjunction with the inward flare or taper 13 of the outer portion of the flutes, helps appreciably to deaden the vibration of the incoming exhaust gases. Each flute 15 as well as the pipe 17 forms a flue for exhaust gases and transfers heat from the exhaust gases to the fresh air in the outer casing as it passes along between the flutes exteriorly of the inner laminated heater structure.

I claim:

1. An automobile heater of the exhaust type comprising an outer casing for the air to be heated having an air inlet and an air outlet, and an inner laminated structure for conducting the exhaust gases through the outer casing to effect heat transfer comprising a plurality of sleeves superimposed one upon the other and fixed together at spaced points, each of said sleeves comprising a plurality of radially arranged flutes, the inner portion of the flutes flaring out and the outer portion of the flutes tapering inwardly to form an opening for the exhaust gases.

2. An automobile heater of the exhaust type comprising an outer casing having an air inlet and an air outlet, and an inner structure for conducting the exhaust gases through the outer casing to effect heat transfer comprising a plurality of similar sleeves superimposed one upon the other, each sleeve comprising a plurality of radially arranged flutes, the said sleeves being fixed together at spaced points, and a pipe positioned lengthwise of the inner structure and fixed at spaced points to the inner portion of the said flutes, the said inner structure having an inlet and an outlet for the exhaust gases.

3. An air heater of the exhaust type for an automobile comprising an outer casing of approximately uniform cross-sectional area for the air to be heated having an air inlet and an air outlet spaced longitudinally of the casing from the air inlet, an inner structure for conducting the exhaust gases through the outer casing to effect heat transfer comprising a sleeve having a plurality of longitudinally arranged flutes, the said sleeve having a small clearance with the outer casing and a tapered end adjacent the air inlet opening to form an enlarged air distributing space with the outer casing adjacent the air opening whereby the air passing through the air inlet is distributed around the fluted sleeve and passes along the outside thereof between a plurality of flutes.

4. An air heater of the exhaust type for an automobile comprising an outer casing for the air to be heated having an air inlet adjacent one end and an air outlet adjacent the other, an inner structure for conducting the exhaust gases lengthwise through the outer casing to effect heat transfer comprising a plurality of sleeves one within another, each sleeve comprising a plurality of radially arranged flutes, the inner end portions of the flutes flaring out and the outer end portions of the flutes tapering inwardly to form an opening for the exhaust gases whereby a greater air space is formed between the inner structure and the outer casing adjacent the air inlet and air outlet than between the air inlet and air outlet.

5. An automobile heater of the exhaust type comprising an outer casing for the air to be heated having an air inlet adjacent one end and an air outlet adjacent the other, an inner structure for conducting the exhaust gases through the outer casing to effect heat transfer comprising a pipe, and a plurality of sleeves one within another surrounding the said pipe and fixed to the pipe and to each other at spaced points, each of the sleeves comprising a plurality of integral radially arranged flutes extending lengthwise of the outer casing.

6. An automobile heater of the exhaust type comprising an outer casing for the air to be heated having an air inlet at one end and an air outlet at the other end, an inner sleeve for conducting the exhaust gases through the outer casing to effect heat transfer comprising a plurality of radially arranged flutes, the inner end portions of the flutes flaring outwardly and the outer end portions of the flutes tapering inwardly to form inlet and outlet openings for the exhaust gases, and a pipe positioned within the inner sleeve and extending longitudinally thereof, the said pipe being fixed to the inner sleeve at the junctions of the adjoining flutes.

7. An automobile heater of the exhaust type comprising an outer casing of approximately uniform cross-sectional area for the air to be heated having an air inlet at one end and an air outlet at the other, an inner sleeve structure for conducting the exhaust gases through the outer casing to effect heat transfer, the said sleeve comprising a plurality of radially arranged flutes the inner end portions of which flare outwardly and the outer end portions of which taper inwardly to provide a greater clearance with the outer casing adjacent the inlet and outlet openings than between the end portions of the sleeve and to form inlet and outlet openings for the exhaust gases whereby the air entering the air inlet is distributed around the tapered end of the sleeve and passes lengthwise of the outer casing exteriorly and between the radially arranged flutes, and a pipe of less length than the sleeve positioned within the inner sleeve and extending lengthwise thereof between the tapered end portions and in contact with and fixed to the inner sleeve at the junctions of the adjoining flutes.

8. An air heater of the exhaust type for an automobile, comprising an elongated outer casing for the air to be heated insertable into the exhaust conduit, said casing having an air inlet and an air outlet spaced longitudinally of said outer casing and located adjacent the ends and opening through the side thereof, an inner structure concentrically arranged in said outer casing for conducting the exhaust gases therethrough to effect heat transfer, said inner structure having small clearance with the outer casing centrally thereof between the tapered ends and being tapered at the ends to form enlarged air distributing spaces adjacent said inlet and outlet whereby the air passing through said casing is distributed around said inner structure, said inner structure comprising a plurality of longitudinally extending flutes whereby the air entering the inlet is distributed about the outside of said fluted inner structure and passes along the outside thereof between the flutes to effect heat exchange with the exhaust gases within the flutes.

JAMES J. SUNDAY.